May 11, 1954

C. A. JAEGER 2,678,401

LOW DISTORTION ALTERNATING CURRENT
PHOTOELECTRIC APPARATUS
Filed Sept. 28, 1950

INVENTOR.
CHARLES A. JAEGER

BY  Orin R. Severn his ATTORNEY.

Patented May 11, 1954

2,678,401

UNITED STATES PATENT OFFICE 2,678,401

LOW DISTORTION ALTERNATING CURRENT PHOTOELECTRIC APPARATUS

Charles A. Jaeger, Columbus, Ohio, assignor to Curtiss-Wright Corporation, a corporation of Delaware Application September 28, 1950, Serial No. 187,333

7 Claims. (Cl. 250—209)

This invention relates to photoelectric apparatus, particularly to alternating current photoelectric pick-up apparatus, and has for its principal object the provision of improved alternating current photoelectric pick-up apparatus capable of eliminating distortion or non-linearity in the alternating current output.

Heretofore the operation of alternating current photoelectric pick-up apparatus using selenium cells, for example, involved a certain amount of distortion or non-linearity in the current output regardless of whether the photoelectric cell was light-activated or not, which in turn resulted in the generation of harmonic voltages. This is due to the fact that the resistance of a photovoltaic cell, when used as a photo-conductive cell, changes when the polarity of the applied E. M. F. reverses. When a sinusoidal voltage is applied to such a cell the magnitude of the current during the positive half cycle will differ from the magnitude of the current flowing on the negative half cycle, thus producing a modified rectifying action.

I have found that this non-linearity can be overcome and the current output made symmetrical by "splitting" the photoelectric cell into two equal parts, such as by scoring the surface layer of the cell so as to produce two electrically equal surfaces upon a common base. The alternating current circuit connections are made only at the equal selenium surface layers so that the circuit extends from one A. C. terminal through its connected surface layer to the common iron base and then through the other surface layer to the opposite terminal, thus forming in effect two cells connected in series back-to-back. Accordingly, when an E. M. F. of either polarity is applied across the terminals, one of the sections presents a high resistance whereas the other section presents a low resistance. Since the two sections are eletrically equal, it will be seen that the total resistance of the series circuit is uniform, thus resulting in symmetrical current flow when alternating current is applied across the terminals. This symmetry of current flow holds whether the photoelectric unit be light-activated or otherwise.

The invention will be more fully set forth in the following description referring to the accompanying drawing, and the features of novelty will be pointed out with particularity in the claims annexed to and forming a part of this specification.

Referring to the drawing.

Figure 1:
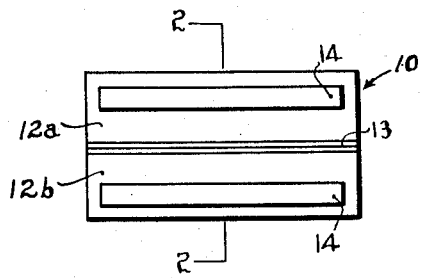
Fig. 1 is a view of an alternating current photoelectric unit used in the present invention.
Figure 2:
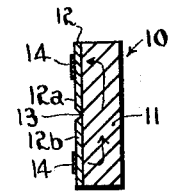
Fig. 2 is a cross-sectional view of the photoelectric unit taken along the line 2—2 of Fig. 1.

Figs. 1 and 2 illustrate by way of example one form of photoelectric apparatus that can be used in practicing the present invention. As shown in the drawing, the photoelectric cell generally designated 10 is provided with an iron base 11 to which is applied in a manner well known in the art a selenium coating or layer 12. The light-sensitive selenium layer is divided into two equal parts 12a and 12b along the scoring 13, and each part is connected to a silver contact strip 14 to which the electrical circuit connections are joined. It is preferable to split the cell in the manner shown rather than to utilize two separate cells since any variation in selenium coating between different cells will cause a variation in the electrical resistance of the cell. However, it will be understood that the present invention comprehends any suitable two-part cell having electrical uniformity as above described.

As shown in Fig. 2, the application of voltage across the contact strip terminals 14, assuming now that the cell is not energized by light, causes current to flow for example, through the selenium layer 12b to the iron base 11 and out through the selenium layer 12a to the other contact terminal strip 14. With this arrangement, the high resistance to the current flowing from the selenium to the iron base is added to the low resistance to the current going from the iron base to the selenium so that, assuming electrical uniformity, the total resistance remains constant regardless of the direction of the current; i. e., the polarity of the applied voltage. As above pointed out, this requires that the selenium parts be equally divided in order to prevent variations in resistance due to difference in the areas of the selenium-iron junctions.

The application of voltage to the double cell as shown energizes a series connection of two cell parts connected back-to-back. This arrangement provides the advantage that the total resistance of the two parts in series produces a greater change in resistance when the photoelectric unit is light activated than a single cell when used in an alternating current system. In order to illustrate this point, a hypothetical case will be considered in which the unenergized, unilluminated resistance of two cell parts is 25,000 ohms when current flows from the selenium to the iron and is 1,000 ohms when the current flows from the iron to the selenium. These same cells have a light-activated resistance of 10,000 ohms when the current flows from the selenium to the iron and 800 ohms when the current flows from the iron to the selenium. Thus the total series resistance in the unenergized condition is 26,000 ohms whereas in the light-activated condition the total series resistance is but 10,800 ohms. This produces an increase of resistance of 140 percent from the light-activated value regardless of the direction of current. Considering a single cell, the resistance in one direction when the cell is not light energized is 25,000 ohms and when light energized it is 10,000 ohms. However, when the direction of the current is reversed the unenergized resistance is 1,000 ohms and the energized resistance is 800 ohms. Thus it is noted that the change in resistance between the energized and unenergized condition of the cell is high when the current is in one direction but is much lower in the other direction.

Figure 3:
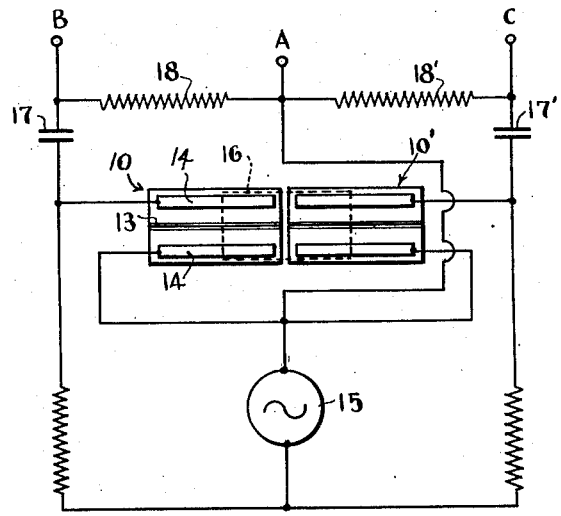
Fig. 3 is a circuit diagram illustrating a specific application of the invention.

Referring to Fig. 3, there is shown an alternating current sensing network, specifically a bridge circuit having an alternating current source 15 and a pair of photoelectric double cells unit 10 and 10' constructed according to the present invention and connected in respective bridge arms of the circuit. The bridge arms include condensers 17 and 17' respectively and the other bridge arms include fixed resistances 18 and 18' respectively. The bridge junction terminals A, B and C comprise the output terminals of the bridge circuit, it being apparent by inspection that any variation in current flow through the bridge arms containing the cell units 10 and 10' respectively, is reflected in variation in potential across the resistances 18 and 18' respectively.

In the operation of the arrangement shown, a beam of light is directed to the cell units in such a manner that it falls equally about the cell split lines 13. The light pattern, designated by dotted lines 16, is equally divided between the two cell units 10 and 10' when the light source is in a centered or neutral position and moves either to the left or right when the light source is moved. In the particular arrangement, the light pattern moves only along the horizontal axis as shown so that unbalance of the amount of light about the cell split lines 13 is prevented. When the light pattern is moved off center with respect to the cells 10 and 10', the bridge circuit is unbalanced and the potential across the terminals AC changes relative to the potential across the terminals AB. This difference in potential at the output terminals can be used by suitable electronic means well known in the art which in turn may operate a control system, such as for example, an aircraft guidance system that is operatively connected to the light source for returning the same to its proper or centered position wherein the potentials across the terminals AC and AB are equal.

It should be understood that this invention is not limited to specific details of construction and arrangement thereof herein illustrated, and that changes and modifications may occur to one skilled in the art without departing from the spirit of the invention.

What is claimed is:

1. Low distortion, alternating current, photoelectric pickup apparatus comprising a sensing circuit, light sensitive means connected in said circuit comprising a double cell arrangement consisting of two electrically equal light sensitive sections, said equal sections being individually electrically connected in said circuit so as to form in effect a series connection of two photoelectric cells connected back-to-back, and an alternating current source connected to said circuit for electrically energizing said cells according to the light-activation thereof, said cells having a constant total series resistance in said circuit for current flow in either direction so that alternating current flow in said circuit is symmetrical for all degrees of light-activation of said cells.

2. Alternating current photoelectric apparatus comprising a sensing circuit, light sensitive means connected in said circuit, said light sensitive means comprising a common conducting iron base and an equally divided layer of selenium on said base, said equally divided selenium layer being individually electrically connected in said circuit so as to form in effect a series connection of two photoelectric cells connected back-to-back, and an alternating current source connected to said circuit for electrically energizing said cells according to the light-activation thereof, said cells having a constant total series resistance in said circuit for current flow in either direction so that alternating current flow in said circuit is symmetrical for all degrees of light-activation of said cells.

3. Alternating current photoelectric apparatus comprising a network having input and output terminals, light sensitive means disposed in a generally planar arrangement and connected in a branch circuit of said network, said light sensitive means being of the selenium type and individually electrically connected in said branch circuit so as to form in effect a series connection of two electrically equal photoelectric cells connected back-to-back, and an alternating current source connected to input terminals of said network for electrically energizing said cells according to the light-activation thereof, said cells having a constant total series resistance in said branch circuit for current flow in either direction so that alternating current flow in said branch circuit is symmetrical for all degrees of light-activation of said cells whereby potential at said output terminals is also maintained symmetrical.

4. Alternating current photoelectric apparatus comprising a network, light sensitive means connected in a branch circuit of said network, said light sensitive means comprising a common conducting base and an equally divided light sensitive material on said base, said divided material being individually electrically connected in said branch circuit so as to form in effect a series connection of two photoelectric cells connected back-to-back, and an alternating current source connected to said network for electrically energizing said cells according to the light-activation thereof, said cells having substantially constant total series resistance in said branch circuit for current flow in either direction so that alternating current flow in said branch circuit is symmetrical for all degrees of light-activation of said cells.

5. Alternating current photoelectric apparatus comprising a bridge network having input and output terminals, light sensitive means connected respectively in each of two branch circuits of said network, each light sensitive means being individually electrically connected in the respective branch circuit so as to form in effect a series connection of two electrically equal photoelectric cells connected back-to-back, said light sensitive means being mounted adjacent each other so that a symmetrical light pattern can be selectively projected thereon and an alternating current source connected to input terminals of said network for electrically energizing said cells according to the light-activation thereof, said cells having a constant total series resistance in each branch circuit for current flow in either direction so that alternating current flow in said branch circuits is symmetrical whereby potential at said output terminals is also maintained symmetrical for all degrees of light-activation of said cells.

6. Alternating current photoelectric apparatus comprising a sensing network, light sensitive means connected respectively in two branch circuits of said network, said light sensitive means comprising a double selenium cell consisting of a common conducting iron base and an equally divided selenium layer on said base, said divided selenium being individually electrically connected in the respective branch circuit so as to form in effect a series connection of two photoelectric cells connected back-to-back, and an alternating current source connected to said network for electrically energizing said cells according to the light-activation thereof, each double cell having a constant total series resistance in its branch circuit for current flow in either direction so that alternating current flow in said branch circuit is symmetrical for all degrees of light-activation of the cells, said double cells being mounted adjacent each other so that a light pattern is symmetrical with respect to each double cell and is selective with respect to both said double cells.

7. Alternating current photoelectric apparatus comprising a double selenium cell consisting of a common iron base and an equally divided selenium layer on said base, the selenium divisions so formed having equal electrical resistances to current flow in a given direction, means for electrically connecting said selenium divisions in a circuit so as to form in effect a series connection of two photoelectric cells connected back-to-back, and an alternating current source connected to said circuit for electrically energizing said cells according to light activation thereof, said double cell having a constant total series resistance for current flow in either direction for all degrees of light-activation so that alternating current flow through said series connection is symmetrical.

References Cited in the file of this patent
UNITED STATES PATENTS

| Number | Name | Date |
|---|---|---|
| 1,213,616 | Fritts | Jan. 23, 1917 |
| 1,316,699 | Dixon | Sept. 23, 1919 |
| 1,899,026 | Fessenden | Feb. 28, 1933 |
| 2,065,365 | Doyle et al. | Dec. 22, 1936 |
| 2,354,544 | Rath | July 25, 1944 |
| 2,459,293 | Shonnard | Jan. 18, 1949 |
| 2,482,980 | Kallmann | Sept. 27, 1949 |